US012637165B2

(12) United States Patent (10) Patent No.: US 12,637,165 B2

Schlager (45) Date of Patent: May 26, 2026

(54) CARGO TWO-WHEELER

(71) Applicant: MAGNA Automotive Europe GmbH, Vienna (AT)

(72) Inventor: Gerd Schlager, Kefermarkt (AT)

(73) Assignee: MAGNA Automotive Europe GmbH, Vienna (AT)

( * ) Notice: Subject to any disclaimer, the term of this patent is extended or adjusted under 35 U.S.C. 154(b) by 341 days.

(21) Appl. No.: 18/412,774

(22) Filed: Jan. 15, 2024

(65) Prior Publication Data

US 2024/0239432 A1 Jul. 18, 2024

(30) Foreign Application Priority Data

Jan. 17, 2023 (EP) ..................................... 23151892

(51) Int. Cl.
| | |
|---|---|
| *B62K 3/02* | (2006.01) |
| *B62H 1/12* | (2006.01) |
| *B62J 43/13* | (2020.01) |
| *B62J 45/20* | (2020.01) |
| *B62J 45/412* | (2020.01) |
| *B62M 1/38* | (2013.01) |
| *B62M 6/45* | (2010.01) |
| *B62M 6/90* | (2010.01) |

(52) U.S. Cl.
CPC ................. *B62K 3/02* (2013.01); *B62H 1/12* (2013.01); *B62J 43/13* (2020.02); *B62J 45/20* (2020.02); *B62J 45/412* (2020.02); *B62M 1/38* (2013.01); *B62M 6/45* (2013.01); *B62M 6/90* (2013.01)

(58) Field of Classification Search
CPC ........... B62K 3/02; B62J 45/412; B62J 45/20; B62H 1/12; B62M 1/38; B62M 6/45; B62M 6/90
See application file for complete search history.

(56) References Cited

U.S. PATENT DOCUMENTS

| | | | | | |
|---|---|---|---|---|---|
| 5,403,027 | A | * | 4/1995 | Hwang ..................... | B62K 3/04 |
| | | | | | 280/278 |
| 9,963,180 | B2 | * | 5/2018 | Kim .......................... | B62H 1/12 |
| 10,577,045 | B2 | * | 3/2020 | Walter ...................... | B62K 7/02 |
| 11,260,928 | B2 | * | 3/2022 | Taylor .................... | B62K 13/08 |

(Continued)

FOREIGN PATENT DOCUMENTS

| | | | |
|---|---|---|---|
| CN | 108068918 | A1 | 5/2018 |
| ES | 2699331 | A1 | 2/2019 |
| LU | 101703 | B1 | 9/2021 |

OTHER PUBLICATIONS

European Search Report for Application No. 2022P00155EP, Mailed on Jun. 30, 2023.

*Primary Examiner* — Valentin Neacsu
*Assistant Examiner* — Michael R Stabley
(74) *Attorney, Agent, or Firm* — Jordan IP Law, LLC; Todd A. Vaughn

(57) ABSTRACT

A cargo bicycle for transporting a load via a rider. The cargo bicycle includes a front wheel, a rear wheel, a load bed arranged between the front wheel and the rear wheel, a rider seat; and a crank to facilitate the driving of the cargo bicycle by the rider, the crank having, in a longitudinal direction of the cargo bicycle, a crank axis arranged in substantially a same longitudinal position as a rear wheel axis of the rear wheel and away from the load bed.

17 Claims, 3 Drawing Sheets

(56) References Cited

U.S. PATENT DOCUMENTS

| 11,634,190 | B2 * | 4/2023 | Taylor | B62K 13/08 |
|---|---|---|---|---|
| | | | | 180/219 |
| 11,787,502 | B2 * | 10/2023 | Baumgaertner | B62M 6/45 |
| | | | | 701/22 |
| 11,904,983 | B2 * | 2/2024 | Schieffelin | B62K 5/027 |
| 2016/0151215 | A1 * | 6/2016 | Golden, Jr. | A61G 5/104 |
| | | | | 280/304.1 |
| 2017/0158271 | A1 * | 6/2017 | Kim | B62H 7/00 |
| 2020/0156723 | A1 * | 5/2020 | Booker, Jr. | B62H 1/12 |
| 2021/0284276 | A1 | 9/2021 | Pompea | |
| 2022/0411015 | A1 * | 12/2022 | Schieffelin | B62K 5/027 |
| 2023/0211848 | A1 * | 7/2023 | Yun | B62J 9/10 |
| | | | | 280/35 |
| 2023/0286606 | A1 * | 9/2023 | Taylor | B62K 7/04 |

* cited by examiner

CARGO TWO-WHEELER

CROSS-REFERENCE TO RELATED APPLICATIONS

The present application claims priority under 35 U.S.C. § 119 to European Patent Publication No. EP 23151892.9 (filed on Jan. 17, 2023), which is hereby incorporated by reference in its complete entirety.

TECHNICAL FIELD

One or more embodiments of the present disclosure relates to a cargo bicycle for transporting a load via a rider.

BACKGROUND

It is known that loads on a luggage rack can be transported using a bicycle, for example having two or three wheels. Such bicycles have at least one front and one rear wheel and a crank via which the rider can apply a drive force, usually to the rear wheel. A rider seat is usually arranged between the two wheels. The luggage rack is usually arranged on or behind the rear wheel. There are also bicycles which have a structure which is optimized to transport relatively large or heavy loads. For example, it can be provided for a load to be carried on the bicycle in front of the rider.

Also known are two-wheeled scooters, on which a rider can stand on one foot and can push the scooter along with the other foot by pushing off from the road surface in order to apply the necessary drive energy. Such scooters are not usually suitable for conveying relatively large loads.

SUMMARY

The one or more embodiments of the present disclosure is to specify a cargo bicycle which allows easy transport of relatively large loads.

This is achieved by a cargo bicycle for transporting a load via a rider, the cargo bicycle comprising a front wheel; a rear wheel; a load bed which is arranged between the front wheel and the rear wheel; a rider seat; a crank to facilitate driving of the cargo bicycle by the rider, the crank having an axis situated in the same longitudinal position as the axis of the rear wheel or even further to the rear, i.e., further away from the load bed, in the longitudinal direction of the cargo bicycle.

In accordance with one or more embodiments, a bicycle is used which has a load bed for receiving loads, the load bed being arranged in front of the rider, specifically at least substantially between the front wheel and the rear wheel. The crank, however, is not arranged between the front wheel and the rear wheel as well, as is usual otherwise, but further to the rear, specifically preferably at the position at which the axis of the rear wheel is also situated, or even further to the rear, in the longitudinal direction of the vehicle. As a result of this position shifted to the rear, a particularly long installation space is available for the load bed and thus for receiving relatively large or relatively long loads.

With such a design, the weight of the rider can be situated to a substantial extent behind the axis of the rear wheel, and thus, behind the point at which the rear wheel rests on the road surface. This unfavorable weight distribution, however, can be balanced out by the fact that the load bed, and in the loaded state a load on the load bed, is situated further forwards on the bicycle. This arrangement can thus be particularly advantageous for a cargo bicycle.

Preferably, in accordance with one or more embodiments, the rider seat is situated behind the axis of the rear wheel, i.e., further away from the load bed than the axis of the rear wheel, in the longitudinal direction of the cargo bicycle. The rider can thus sit behind the rear wheel. The weight can still be balanced out by the front structure and a conveyed load on the cargo bicycle.

Preferably, in accordance with one or more embodiments, the axis of the crank is situated in the same height position as the axis of the rear wheel in the vertical direction. Preferably, the axis of the crank coincides with the axis of the rear wheel, i.e., is in the same horizontal and vertical position. The crank and the rear wheel are thus preferably coaxial.

The load bed can be substantially a plane or for example form a container which is open at the top, i.e., comprise a bottom face and side faces. The container can for example also have a lid, for example for closing the container.

Preferably, in accordance with one or more embodiments, the cargo bicycle has a scooter mode in which the rider seat and the crank are in a non-use position. For example, the rider seat and/or the crank may be removed.

Preferably, in accordance with one or more embodiments, the cargo bicycle has a bicycle mode in which the rider seat and the crank are in a use position.

Preferably, in accordance with one or more embodiments, the cargo bicycle has a handlebar which is preferably situated in the vicinity of the rear wheel. The handlebar can preferably be used both in bicycle mode and in scooter mode.

The position of the handlebar and/or of the rider seat in the vertical direction and/or in the longitudinal direction is preferably adjustable within a predefined range.

The crank is preferably designed such that it can be reconfigured by the rider to form a standing aid, so that the standing aid can be used in scooter mode and the crank can be used in bicycle mode. The change between crank and standing aid, for example, standing board or standing boards, can be carried out in a simple manner by the rider, preferably without the need for a tool. In the simplest embodiment, the standing aid in scooter mode can be formed by pivoting a crank half downwards towards the road surface. Preferably, however, the standing aid in scooter mode is formed such that both crank halves act as a standing aid at the same time, in particular are fixed in position relative to a force acting downwards from above.

Preferably, in accordance with one or more embodiments, the standing aid in scooter mode is formed in that both crank halves point in the same direction, i.e., form an angle of 0 degrees with one another. In bicycle mode, the two crank halves of the crank point in opposite directions, i.e., form an angle of 180 degrees with one another.

The two crank halves of the standing aid in scooter mode can be secured against rotation relative to one another or can be unsecured. The two crank halves of the standing aid in scooter mode can be directed exactly downwards towards the road surface, for example by the weight of the rider's foot, or can be locked at a predefined or adjustable angle.

Preferably, in accordance with one or more embodiments, the cargo bicycle has a drive battery for applying an electrical energy for an electrical drive, wherein the electrical drive can be usable for example in addition to the drive energy applied by the rider. The drive battery is preferably arranged close to the front wheel, so that the center of gravity of the drive battery is situated in front of the center point of the load bed in the longitudinal direction of the cargo bicycle. As a result, the cargo bicycle is weighed down by the drive battery more at the front than at the rear.

Preferably, in accordance with one or more embodiments, the cargo bicycle has, in addition to the front and rear wheels, a load wheel, which can optionally be moved from a non-use position into a use position by the rider or by a device, for example when a heavy weight is carried on the load bed. In the use position, the load wheel is preferably in contact with the road surface. The load wheel can preferably be arranged in the vicinity of the front wheel. When the load wheel is in the use position, the front wheel can then likewise be in contact with the road surface or out of contact with the road surface. The load wheel is preferably an omnidirectional wheel, i.e., a poly wheel or omni wheel, so that the cargo bicycle can be moved in a plurality of movement directions via the omnidirectional wheel.

Preferably, in accordance with one or more embodiments, the load wheel can be moved from a non-use position into a use position in an automated manner by a control unit, depending for example on the weight on the load bed and/or the tire pressure of the front and/or rear wheel and/or the speed of travel of the cargo bicycle.

Preferably, in accordance with one or more embodiments, the cargo bicycle has a control unit which is configured to drive autonomously without a rider on the cargo bicycle via electrical drive and via the load wheel in the use position, in particular in a following mode, in which the cargo bicycle follows the rider, for example, and/or in an autonomous driving mode, in which the cargo bicycle can steer autonomously in order to follow the course of a road, for example.

Preferably, in accordance with one or more embodiments, the cargo bicycle has a control unit which is configured to simplify or assist a process of loading/unloading the load bed via an automated braking operation and/or by balancing out the cargo bicycle via the load wheel in the use position.

DRAWINGS

One or more embodiments of this disclosure will be illustrated by way of example in the drawings and explained in the description hereinbelow.

DESCRIPTION

Figure 1:
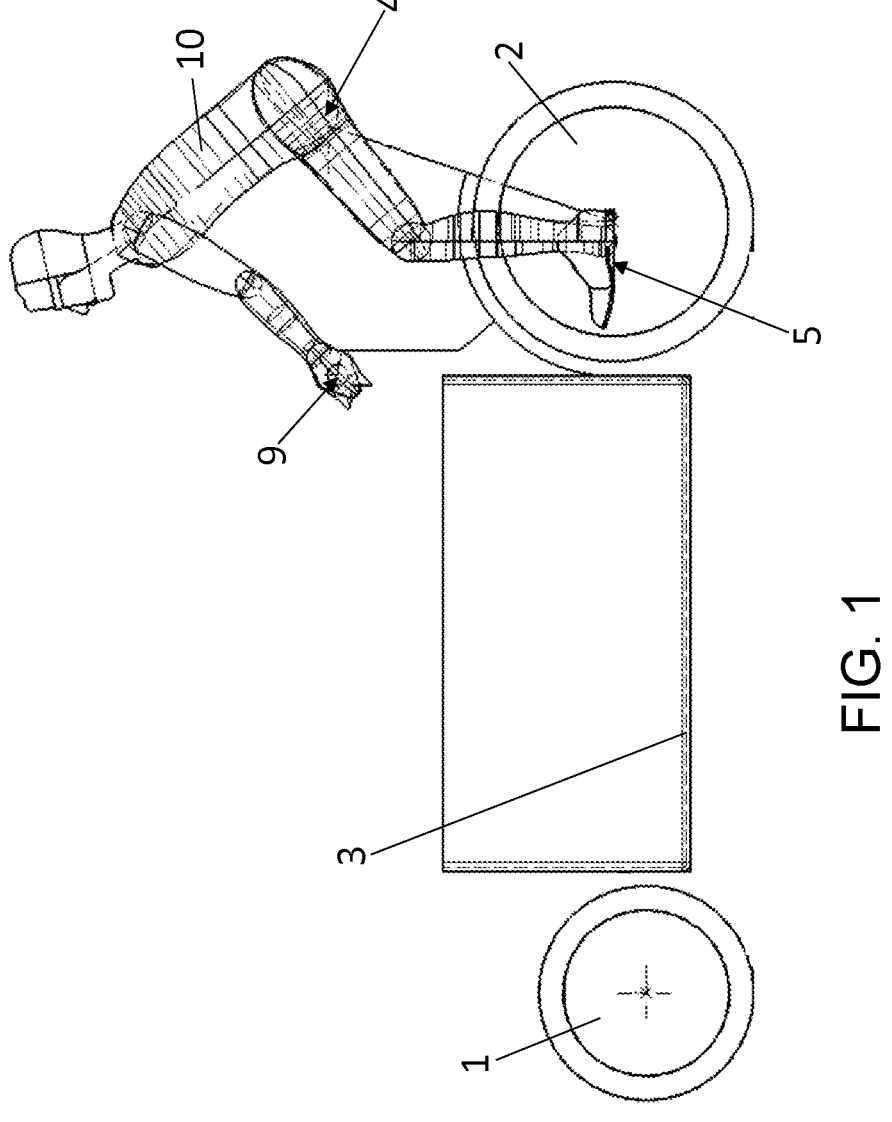
FIG. 1 is a side view of a cargo bicycle driven by a rider operating the cargo bicycle in bicycle mode, in accordance with one or more embodiments.
Figures 2, 3:
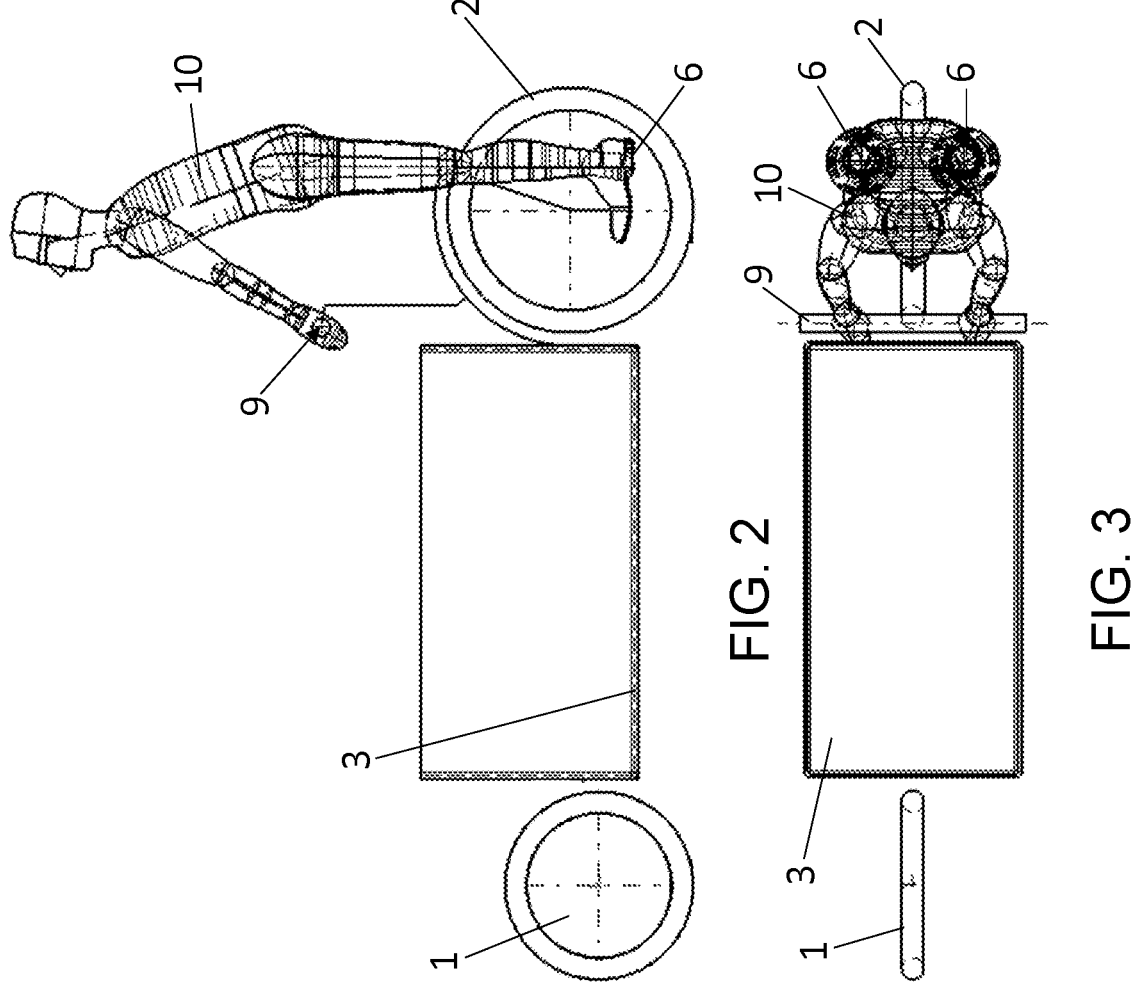
FIG. 2 is a side view of the cargo bicycle of FIG. 1 in scooter mode.
FIG. 3 is a top view of the cargo bicycle of FIG. 2 in scooter mode.

FIG. 1 through 3 show a cargo bicycle for transporting a load via a rider 10, in accordance with an embodiment. The cargo bicycle comprises a front wheel 1 and a rear wheel 2, and is thus, a bicycle. A load bed 3, which also comprises side walls in the illustrated embodiment, is arranged between the front wheel 1 and the rear wheel 2.

The cargo bicycle comprises a rider seat 4 which is situated behind the axis of the rear wheel 2, i.e., further away from the load bed 3 than the axis of the rear wheel 2, in the longitudinal direction of the cargo bicycle.

The cargo bicycle comprises a handlebar 9, which is situated in the vicinity of the rear wheel 2 in the longitudinal direction, for example, over the load bed 3 and/or between the load bed 3 and the axis of the rear wheel 2, preferably approximately in the region of the front end of the rear wheel 2 as shown in FIG. 1.

The cargo bicycle can be driven by the rider 10 via a crank 5, wherein the axis of the crank 5 is situated in the same longitudinal position as the axis of the rear wheel 2 in the longitudinal direction of the cargo bicycle. The axis of the crank 5 is also situated in the same height position as the axis of the rear wheel 2 in the vertical direction, so that the axis of the crank 5 coincides with the axis of the rear wheel 2.

Figure 4:
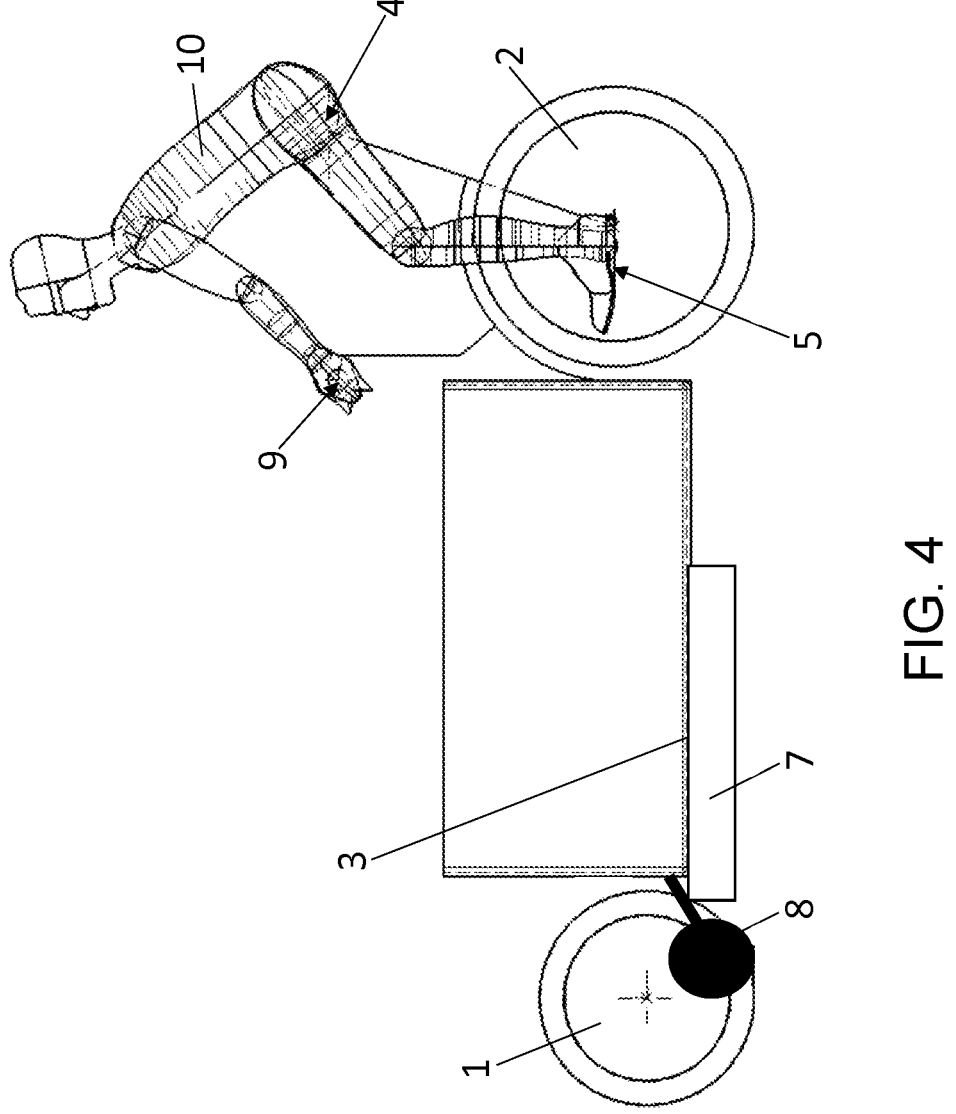
FIG. 4 is a side view of a cargo bicycle driven by a rider operating the cargo bicycle in bicycle mode, in accordance with one or more embodiments.

The cargo bicycle is shown in FIGS. 1 and 4 in a bicycle mode in which the rider seat 4 and the crank 5 are in a use position.

The cargo bicycle is shown in FIGS. 2 and 3 in a scooter mode in which the rider seat 4 and the crank 5 are in a non-use position. In particular, the rider seat 4 is removed here. The crank 5 is reconfigured to form a standing aid 6 so that the rider 10 can stand with at least one leg on the standing aid 6. More precisely, in this case both crank halves form standing aids 6, which would be usable for one foot each, so that the standing aid 6 is usable on both sides of the cargo bicycle.

The standing aid 6 in scooter mode is formed in that both crank halves of the crank 5 point in the same direction, i.e., form an angle of 0 degrees with one another, whereas in bicycle mode (FIGS. 1 and 4) the two crank halves point in opposite directions, i.e., form an angle of 180 degrees with one another.

As shown in FIG. 4, the cargo bicycle can have a drive battery 7 for applying an electrical energy for an electrical drive, wherein the drive battery 7 is arranged close to the front wheel 1, so that the center of gravity of the drive battery 7 is situated in front of the center point of the load bed 3 in the longitudinal direction of the cargo bicycle.

The cargo bicycle of FIG. 4 has one or more load wheels 8 in addition to the front wheel 1 and the rear wheel 2. The one or more load wheels 8 are preferably omnidirectional wheels arranged on the left side and/or right side of the front wheel 1, preferably on the left side and right side. The one or more load wheels 8 can optionally be moved from a non-use position into a use position. For example, the one or more load wheels 8 can be moved from a non-use position into a use position in an automated manner by a control unit, in particular extended such that it touches the road surface, depending, for example, on the weight on the load bed 3 and/or the tire pressure of the front wheel 1 and/or the rear wheel 2 and/or the speed of travel of the cargo bicycle.

The cargo bicycle can have a control unit which is configured to drive autonomously without a rider on the cargo bicycle via electrical drive and via the one or more load wheels 8 in the use position, in particular in a following mode and/or in an autonomous driving mode.

The cargo bicycle can have a control unit which is configured to simplify a process of loading/unloading the load bed 3 via an automated braking operation and/or by balancing out the cargo bicycle via the one or more load wheels 8 in the use position.

LIST OF REFERENCE SIGNS

1 Front wheel
2 Rear wheel
3 Load bed
4 Rider seat
5 Crank
6 Standing aid
7 Drive battery 8 Load wheel(s)
9 Handlebar
10 Rider

What is claimed is:

1. A cargo bicycle for transporting a load via a rider, the cargo bicycle comprising:
    a front wheel;
    a rear wheel;
    an omnidirectional load wheel moveable between a non-use position and a use position:
    a load bed arranged between the front wheel and the rear wheel;
    a rider seat;
    a crank to facilitate the driving of the cargo bicycle by the rider, the crank having, in a longitudinal direction of the cargo bicycle, a crank axis arranged in substantially a same longitudinal position as a rear wheel axis of the rear wheel and away from the load bed; and
    a control unit operable to facilitate loading and unloading of the load bed via an automated braking operation and/or by balancing out the cargo bicycle via automated movement of the omnidirectional load wheel in the use position.

2. The cargo bicycle of claim 1, wherein the rider seat is arranged, in the longitudinal direction of the cargo bicycle, behind the rear wheel axis and away from the load bed.

3. The cargo bicycle of claim 1, wherein:
    the crank axis is arranged, in the vertical direction of the cargo bicycle, in substantially a same height position as the rear wheel axis, and
    the crank axis coincides with the rear wheel axis.

4. The cargo bicycle of claim 1, wherein the cargo bicycle is operable between a scooter mode in which the rider seat and the crank are in a non-use position, and a bicycle mode in which the rider seat and the crank are in a use position.

5. The cargo bicycle of claim 4, wherein the crank is reconfigurable to form a standing platform operable for use in the scooter mode and the bicycle mode.

6. The cargo bicycle of claim 5, wherein the standing platform:
    in scooter mode comprises a pair of crank halves at a crank point that are oriented to form an angle of 0 degrees with respect to each other, and
    in bicycle mode the crank halves are oriented in opposite directions to form an angle of 180 degrees with respect to each other.

7. The cargo bicycle of claim 1, further comprising:
    an electrical drive, and
    a drive battery operable to apply electrical energy to the electrical drive, the drive battery being arranged adjacent to the front wheel so that the center of gravity of the drive battery is oriented in front of a center point of the load bed in the longitudinal direction of the cargo bicycle.

8. The cargo bicycle of claim 4, wherein the control unit is operable to automatedly cause movement of the omnidirectional load wheel between the non-use position and the use position.

9. The cargo bicycle of claim 4, wherein the control unit is operable to automatedly cause movement of the omnidirectional load wheel between the non-use position and the use position in response to the load on the load bed, and/or a front wheel tire pressure, and/or a rear wheel tire pressure, and/or a speed of the cargo bicycle.

10. The cargo bicycle of claim 8, further comprising:
    an electrical drive, and the control unit operable to cause driving of the cargo bicycle autonomously via an electrical drive and via the omnidirectional load wheel in the use position.

11. A cargo bicycle for transporting a load via a rider, the cargo bicycle comprising:
    a front wheel;
    a rear wheel;
    one or more omnidirectional load wheels arranged on at least one side of the front wheel for movement between a non-use position and a use position;
    a load bed arranged between the front wheel and the rear wheel;
    a rider seat;
    a crank to facilitate the rider driving the cargo bicycle, the crank having, in a longitudinal direction of the cargo bicycle, a crank axis arranged in a longitudinal position behind a rear wheel axis of the rear wheel and away from the load bed; and
    a control unit operable to facilitate loading and unloading of the load bed via an automated braking operation and/or by balancing out the cargo bicycle via automated movement of the one or more omnidirectional load wheels in the use position.

12. The cargo bicycle of claim 11, further comprising:
    an electrical drive, and
    a drive battery operable to apply electrical energy to the electrical drive, the drive battery being arranged adjacent to the front wheel so that the center of gravity of the drive battery is oriented in front of a center point of the load bed in the longitudinal direction of the cargo bicycle.

13. The cargo bicycle of claim 12, wherein the control unit is operable to cause driving of the cargo bicycler autonomously via the electrical drive and via the one or more omnidirectional load wheels in the use position.

14. The cargo bicycle of claim 11, wherein the control unit is operable to automatedly cause movement of the one or more omnidirectional load wheels between the non-use position and the use position.

15. The cargo bicycle of claim 11, wherein the control unit is operable to automatedly cause movement of the one or more omnidirectional load wheels between the non-use position and the use position in response to the load on the load bed, and/or a front wheel tire pressure, and/or a rear wheel tire pressure, and/or a speed of the cargo bicycle.

16. The cargo bicycle of claim 11, wherein the cargo bicycle is operable between a scooter mode in which the rider seat and the crank are in a non-use position, and a bicycle mode in which the rider seat and the crank are in a use position.

17. A cargo bicycle for transporting a load via a rider, the cargo bicycle comprising:
    a front wheel;
    a rear wheel;
    an omnidirectional load wheel moveable between a non-use position and a use position;
    a load bed arranged between the front wheel and the rear wheel;
    a rider seat;
    a crank to facilitate the rider driving the cargo bicycle, the crank having, in a longitudinal direction of the cargo bicycle, a crank axis arranged in a longitudinal position behind a rear wheel axis of the rear wheel and away from the load bed; and
    a control unit operable to facilitate loading and unloading of the load bed via an automated braking operation and/or by balancing out the cargo bicycle via automated movement of the omnidirectional load wheel in the use position.

* * * * *